(12) United States Patent  
Pintos Pintos

(10) Patent No.: US 8,336,659 B2  
(45) Date of Patent: Dec. 25, 2012

(54) MECHANICAL-COMPRESSOR SYSTEM FOR POTENTIAL ENERGY STORAGE, FOR THE ELECTRIC ENERGY GENERATION FOR ELECTRICAL VEHICLES AND/OR WITH COMPRESSED AIR DRIVEN MOTOR, WITHOUT REMOVING POWER FROM THE MOTOR

(76) Inventor: Guillermo Victor Pintos Pintos, Montevideo (UY)

( * ) Notice: Subject to any disclaimer, the term of this patent is extended or adjusted under 35 U.S.C. 154(b) by 0 days.

(21) Appl. No.: 13/175,974

(22) Filed: Jul. 5, 2011

(65) Prior Publication Data

US 2012/0000722 A1 Jan. 5, 2012

(30) Foreign Application Priority Data

Jul. 5, 2010 (UY) ........................................ U-4342

(51) Int. Cl.  
*B60K 6/00* (2007.10)
(52) U.S. Cl. ....................................................... 180/165
(58) Field of Classification Search ................... 180/65.1, 180/65.51, 65.6, 65.7, 54.1, 164, 165, 116, 180/117, 118, 119, 337, 343, 345, 366, 367  
See application file for complete search history.

(56) References Cited

U.S. PATENT DOCUMENTS

| | | | | |
|---|---|---|---|---|
| 3,507,580 A * | 4/1970 | Howard et al. | ............... | 417/231 |
| 4,032,829 A * | 6/1977 | Schenavar | ........................ | 322/3 |
| 4,777,801 A * | 10/1988 | Porter | ............................. | 60/595 |
| 5,226,801 A * | 7/1993 | Cobile | .......................... | 417/231 |
| 7,261,171 B2 * | 8/2007 | de la Torre et al. | ........ | 180/65.31 |
| 7,828,091 B2 * | 11/2010 | Wedderburn et al. | .......... | 180/2.2 |
| 7,994,648 B1 * | 8/2011 | Fielek | ........................... | 290/1 R |
| 2005/0178115 A1 * | 8/2005 | Hughey | .......................... | 60/413 |
| 2007/0258834 A1 * | 11/2007 | Froloff et al. | ................. | 417/364 |
| 2008/0141921 A1 * | 6/2008 | Hinderks | ....................... | 114/274 |
| 2010/0006362 A1 * | 1/2010 | Armstrong | .................... | 180/165 |
| 2010/0326749 A1 * | 12/2010 | Mensah | ..................... | 180/65.31 |
| 2011/0180340 A1 * | 7/2011 | Peaslee | .......................... | 180/165 |
| 2011/0231047 A1 * | 9/2011 | Aixala et al. | .................... | 701/22 |
| 2012/0000722 A1 * | 1/2012 | Pintos Pintos | ................ | 180/165 |
| 2012/0138372 A1 * | 6/2012 | Cong | ............................. | 180/2.1 |

* cited by examiner

*Primary Examiner* — Katy M Ebner  
*Assistant Examiner* — Brodie Follman  
(74) *Attorney, Agent, or Firm* — Defillo & Associates, Inc.; Evelyn Defillo

(57) ABSTRACT

A mechanical compressor system of potential energy storage for the electric energy generation for electric vehicles and/or with compressed air motor, without withdrawing power to the engine, which allows you as the vehicle travels through irregular terrain: a. take advantage of the vehicle weight to generate startup rpm from generator, both at the ascent and descent of the rack getting the same rpm output of gearbox thus increasing the rpm output of the generator; b. compress air more quickly to have rings of tightness in its cylinder piston which allows to accumulate air compressed by storage tanks through taking advantage of the weight of the vehicle in motion; c. take advantage of the pressure surplus accumulated in the main compressed air storage tank and redirect to the compressed air auxiliary storage tank and after certain pressure, release it into the turbine of the generator in motion and accelerating the movement to generate electricity.

8 Claims, 9 Drawing Sheets

MECHANICAL-COMPRESSOR SYSTEM FOR POTENTIAL ENERGY STORAGE, FOR THE ELECTRIC ENERGY GENERATION FOR ELECTRICAL VEHICLES AND/OR WITH COMPRESSED AIR DRIVEN MOTOR, WITHOUT REMOVING POWER FROM THE MOTOR

TECHNICAL FIELD OF THE INVENTION

The present invention relates to the technical field of automotive mechanical engineering, and within it, to the advantage of using moving potential energy proceeding from electric vehicles and/or with a compressed air engine in order to increase the vehicle autonomy.

BACKGROUND OF THE INVENTION

This document has as antecedent, the utility model patent application called "G.V.P.P.—Voltage Generation by Weight", Application U 4342 filed in Uruguay on Jul. 5, 2010. This Uruguayan document motivates the partial priority claim in the present U.S. patent application.

The Uruguayan document explains the limited autonomy problem found in vehicles operating with an electric motor and vehicles operating by compressed air. This limited autonomy is caused, in the case of electric motor vehicles, by using the same power network to feed the engine, as well as the other electrical devices and the impossibility of the user to recharge the battery bank. In the case of compressed air motor vehicles, limited autonomy occurs in the loss of engine power to be able to load the battery, which is used to feed the vehicle electrical devices such as heating or lights, and the impossibility of auto-recharging the air storage tanks that the vehicle brings from the factory.

To increase the autonomy of the vehicle, in the above-identified Uruguayan patent application, the invention intends to use the weight of the automotive vehicle in motion as potential energy to produce movement or rotation work; the invention is based on the combination of a compressor mechanism with a mechanical mechanism, which operates in an interdependent manner, to produce the above indicated rotation work used to move an alternate current generator.

By using a compressor mechanism, strategically placed on the vehicle suspension, it enables to take advantage of the weight of the vehicle. This compressor mechanism comprises: four cylinders having four pistons or diaphragms strategically placed, as if they were shock absorbers; one-way valves; a storage tank, which in the case of compressed air vehicles they are not the ones that come from the factory nor replace them, and pipes. The compressed air is released from the tank through an actuator commanded by an electronic module, accelerates a wheel turbine kinetic energy accumulator. When this piece turns, it can give impulse to an AC generator able to directly feed the motor or to charge a battery bank.

The mixed mechanical compressor system that was proposed in the Uruguayan patent application, on its mechanical part, is capable of transforming the ascending and descending movements of the vehicle suspension in rotary motion, using a sprocket and gear system mounted on shafts in a gear box. The rotary movement is used to start the rotation of the wheel turbine accumulator. The gearbox is coupled to the bodywork and a rack is fixed to the rear axle, or to a fifth wheel mounted with the sole purpose of moving the rack.

The mechanism's interdependence is given by the fact that the gearbox gives the initial movement to the wheel turbine accumulator of kinetic energy, and then the compressor mechanism, by releasing air, accelerates the wheel turbine accumulator increasing rpm in a sufficient quantity to generate electricity.

Improvements Introduced by the Present Invention

The present invention introduces improvements to the invention of the Uruguayan patent application previously mentioned. This document discloses a mechanical compressor system for potential energy storage for generation of electricity for electric vehicles or compressed air vehicles, without withdrawing power to the engine.

This invention improves the ascending and descending movement of the rack with regard to what was happening in the Uruguayan invention, since in the prior invention, the same amount of rpm output was not obtained during the ascend and descent of the rack. In this invention, during both the ascending and descending of the rack, the same gearbox output revolutions are obtained, increasing the generator output rpm.

In the Uruguayan invention, the excess air which is not admitted in the storage tank during the air pressure intake process is released to the exterior. In the present invention, an auxiliary storage tank, with an independent extra auxiliary safety valve and an extra pipe system, stores this excess air that can be used, because the download of the safety valve of the main tank in the present invention goes to the auxiliary tank. The two tanks that are part of the present invention are not the ones that come with compressed air vehicles from the factory, nor replace them.

The Uruguayan invention discloses the possibility of using diaphragms as an alternative to the use of pistons located within the cylinder, to compress the air. The present invention eliminates the diaphragms, operating only with pistons with airtight sealing rings located inside the cylinders achieving a more efficient air compression.

In the weight of the vehicle, there is a potential energy in which the present system takes advantage. The weight of the moving vehicle is transformed into kinetic energy for the generator to produce electricity. The system uses the aforementioned energy to give motion to a current generator without withdrawing power from the vehicle electric motor or to the compressed air engine. The system generates an alternate current which is sent to a continuous AC converter. This converter commanded by an electronic module may send its energy to the motor controller, or, such motor controller may feed the vehicle battery bank. The module may control the converter feeding, for example, through the inverter relay system or through the use of high power transistors. In the case of compressed air vehicles, the present invention stores air in two tanks, which are not the ones brought by the vehicle from the factory. This stored air allows it to produce electricity and to feed the vehicle electric compressor installed at the factory, thereby, compressing air in the factory-installed vehicle tanks, which are the ones that store air to move the engine.

The objective of this invention is to increase the autonomy of the above-mentioned vehicles, without prejudice to the free use of elements such as lighting, heating, air conditioning, audio system, which are fed with electricity, as well as the motor, decreasing their autonomy.

The mechanical compressor system is commanded by an electronic module through sensors and actuators.

DESCRIPTION OF THE INVENTION

The mechanical compressor storage system for potential energy for the electric energy generation for electric vehicles or compressed air engine, without withdrawing power to the engine, compresses air in two tanks through cylinders, one for each wheel, strategically placed as if they were shock absorbers, each with a piston, and an arm which are joined to a suspension grid in the case of vehicles of three or more wheels, or attached to the suspension bracket and arms in light vehicles. In the case of vehicles of three or more wheels, the arms may be coupled to a top grid or to a lower grid, depending on the suspension model (FIG. 1). The cylinders, having heat dissipation fins, include two vertical slots to allow the rising of the piston to the upper dead point. By these slots slides an axis. The rod is secured to said axis which is secured to the upper or lower grid. Also, the cylinders have pistons with airtight sealing rings and are lubricated by known methods, for example the use of an external deposit with pipe to each of the valves for admission (22) with a calibrated orifice of oil.

An example of a cylinder assembly, a cylinder has a thread in its outer upper end that serves to connect with thread to the cylinder cover, having between them a rubber seal or ring. The cylinder cover has an outer thread to be connected to a bridge on the bodywork.

The cylinder cover includes three one-way valves that screw in three holes located at the cylinder cap. One of the three valves admits the entry of air from the outside that then enters on the cylinder previously filtered by known methods. The other two one-way valves are air exhausts which are led from the cylinder through pipes to two tanks. These pipes include two tubes per cylinder that drive the air from the valves toward the storage tanks. The tubes are made of flexible material in part of their sections to withstand movements without breaking.

A turbine in a casing, similar to those used for pneumatic tools, is built as for the one used for a wheel kinetic energy accumulator. Said turbine is welded to the axis of a current generator, and is located so that it can be coupled or uncoupled to the gearbox which will be described below.

The two air storage tanks have the capacity to withstand the required pressure to increase the movement of the turbine and have two safety valves, the one for the main tank has a double role, as it directs the air excess to the auxiliary tank, and the one for the auxiliary tank directs pressure excess to the outside. The tanks may be located in the area of the vehicle that is most convenient for the manufacturer. As the air pressure increases inside the tanks, the air is released through electro valves, one for each tank. The air, once released, is led through pipes to the turbine casing. The electro valves are actuators commanded by an electronic module.

A pressure sensor (51) is located in each of the storage tanks.

A rotation sensor of Hall's effect is located in a gearbox next to the output gear and is responsible for counting the rpm of the box. A second rotation sensor of Hall's effect is located in the turbine casing and is responsible for counting the rpm of the same, which are the same rpm of the generator.

An alternate to continuous current converter, transforms the generator alternate current into continuous current of the same voltage of the vehicle battery bank. The converter may be controlled by the electronic module in a way of feeding or not feeding the electric motor controller.

At least one gearbox transforms the vehicle weight in movement, to achieve rotation rpm to take advantage to initially move an electric current generator.

Description Example of Gears Assembly:
Pieces of a Gear Box:
Wide rack or two racks linked together by a metal plate. The dimensions of any of the racks may be determined by the usable suspension oscillation according to the vehicle model.

At least three gear trains where the gear dimensions may vary depending on the vehicle model, keeping the scale to be mentioned below, to maintain turning relations among them.
Description of the Gears that are Part of at Least Three Gear Trains:

At least four gears rotate with torque in one direction transmitting force, and in the other direction they freely rotate, so it does not transmit force or torque. Each of the four gears has in its center roller bearings of unidirectional rotation.

There is a simple intermediate gear which reverses the rotation direction on one of the gear trains.
Gear Train Description in the Case that there are Three:
One of the trains includes two type A gears, being one of them (FIG. 7, 36) in contact with the other (FIG. 7, 37), having rotational multiplication between them in function of the diameter ratio between the gears.

Another of the trains includes two type A gears and a type B gear. One of the type A gears (FIG. 7, 40) is in contact with the type B gear (FIG. 7, 41), and this, in turn, with another type A gear (FIG. 7, 42), having a rotation multiplication between them in function of the diameter ratio between the gears.
The Third Train Comprises:
A gear (FIG. 7: 38) fixed to an axis being said axis shared by two gears, one belonging to the train 1 and the other belonging to the train 2, being these last two type A gears (FIGS. 7, 37 and 42); and an output gear to the generator axis (FIG. 7, 39) that freely rotates on the generator axis on a simple rolling bearing with a coupling and decoupling system to the aforementioned generator axis.

In another gear assembly example, at least a planetary gear system is coupled to exit to achieve another rpm multiplication relationship.
Description Examples for Wide Rack Assemblies:
The best way to assemble the wide rack for independent rear suspension vehicles of three or more wheels, is to place an additional wheel at the rear section with its respective suspension grid and spiral spring and other well-known pieces, in the middle of the bodywork; inside the abovementioned spring, the rack is secured to a silemblock fixed on the grid by a screw with an inverted U welded in the rack; the aforementioned wheel is exclusively designed to give motion to the rack. The rack and wheel are assembled on a suspension frame, which will have ascending and descending movements according to the irregularities of the ground (FIG. 5).

Another assembly example, for vehicles of three or more wheels, with rubber rear suspension, the rack attaches to the middle of the rear axle (FIG. 2).

In both examples, the rack is fixed by a screw to a silemblock. In one of the ends of the rack, a plaque is installed having an inverted U shape with perforation for the above mentioned screw.

The rack is attached by a screw with an inverted U-shape welded plate to the silemblock, which is attached to the rear axle. On the smooth or rear side of the rack, center bearings are installed to prevent the movement of the rack. These bearings are placed on an axis, which is housed in the body of the gear box.

An example of the installation of the present invention on a vehicle:

An installation example in a four wheeled vehicle, the gearbox bottom is adhered to the bodywork by means of screws or pins. At the bottom of the gear box there is a slot through which the rack moves vertically, making contact with the gear trains.

A side view of the front suspension showing a cross section of compressor cylinder; an axis, a wheel and an upper grid.

Figure 2:
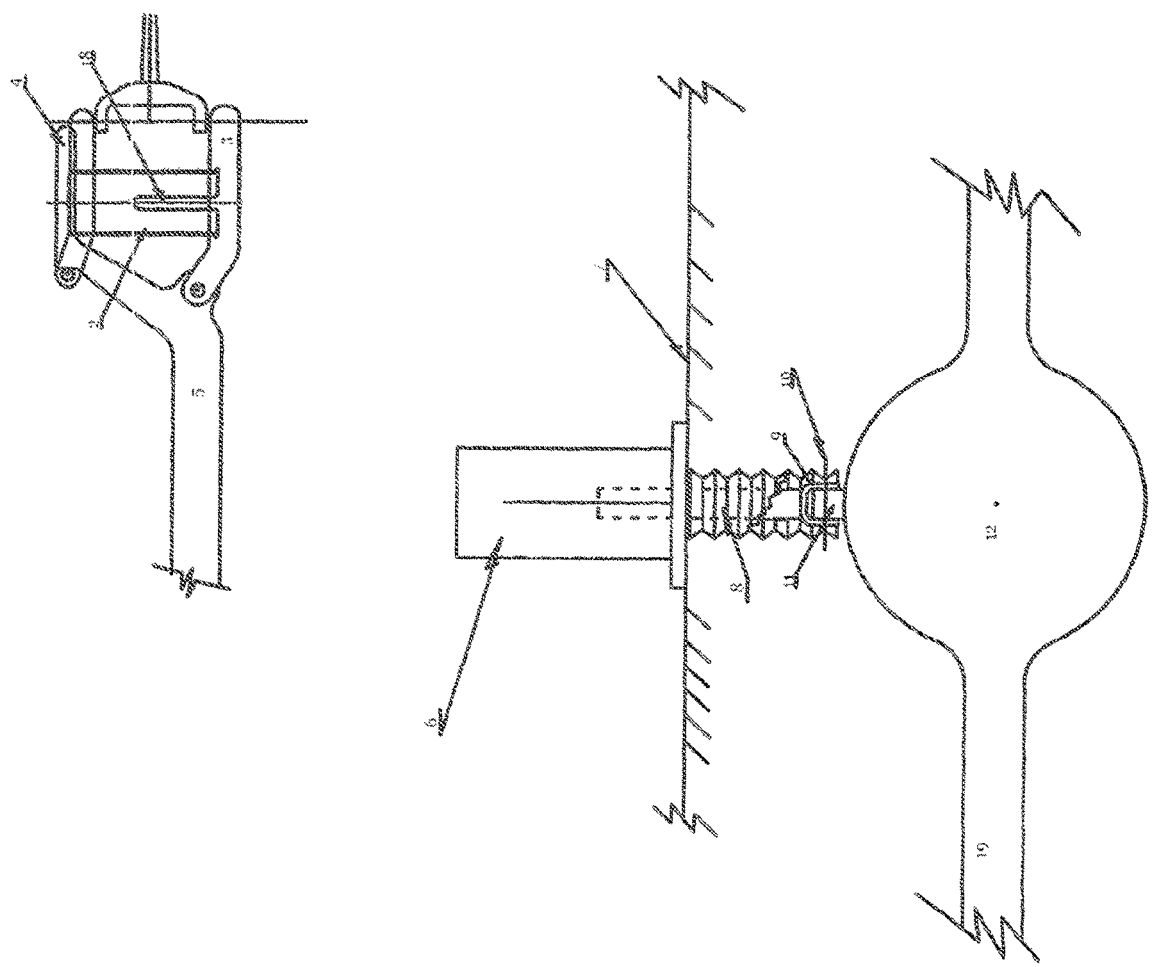

FIG. 2—illustrates a side view of the front wheel assembly showing the location of a cylinder fixed to the bridge, appreciating cylinder slots of the vehicle at its top section.

Side view of the rear wheel assembly with the wide rack assembly installed in the rear axle, in the differential center, through an inverted U system, and a silemblock fixed to the differential with a pin. The gear box is fixed to the bodywork.

Figure 3:
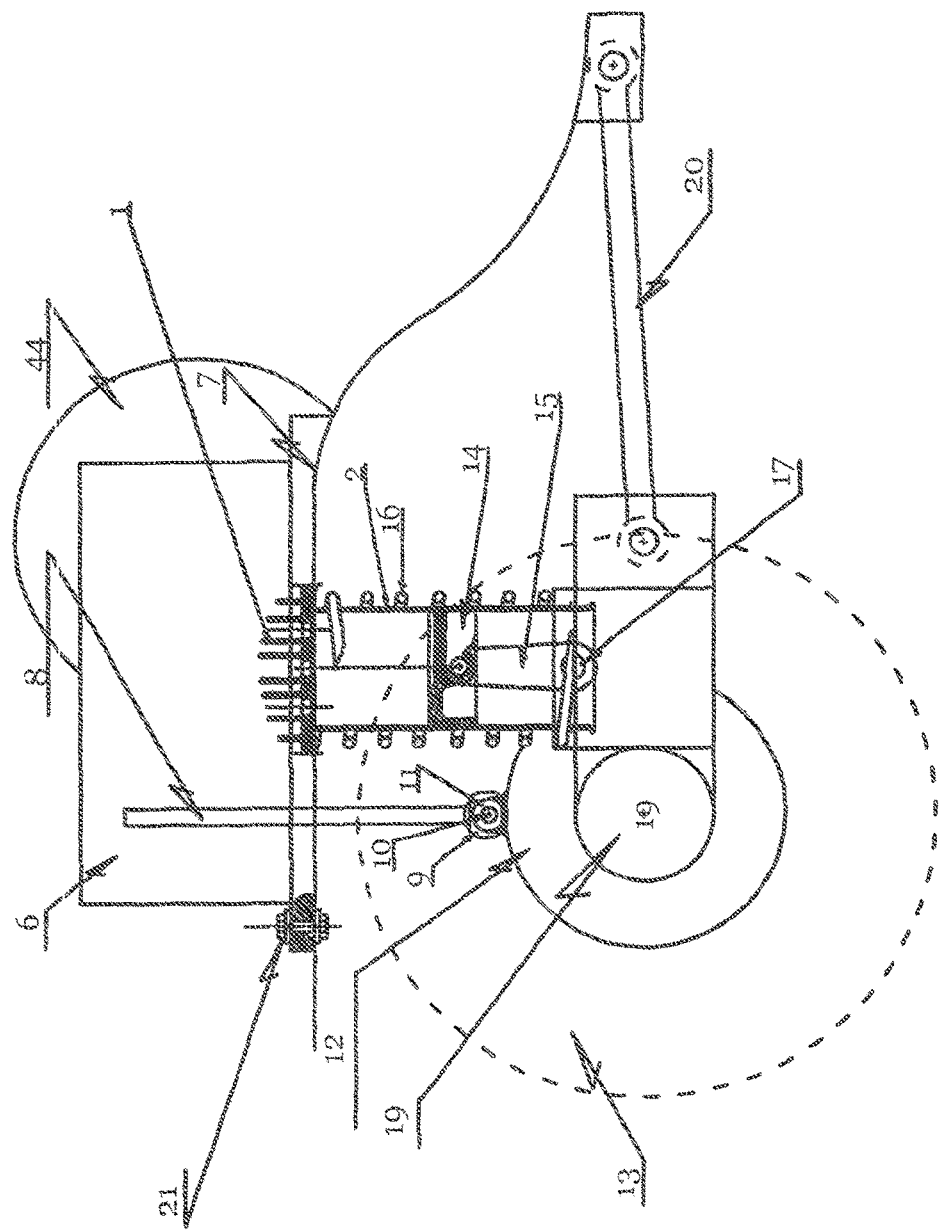

FIG. 3—illustrates a side view of the rear suspension showing a cross section of a compressor cylinder and the location of it on such suspension. The wide rack and gearbox can also be seen.

Figure 4:
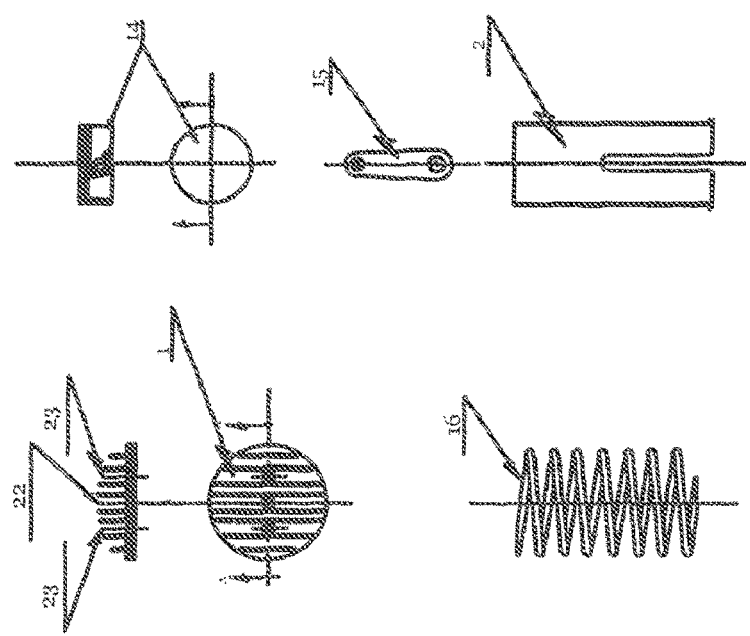

FIG. 4—illustrates an exploded view of a compressor cylinder.

Figure 5:
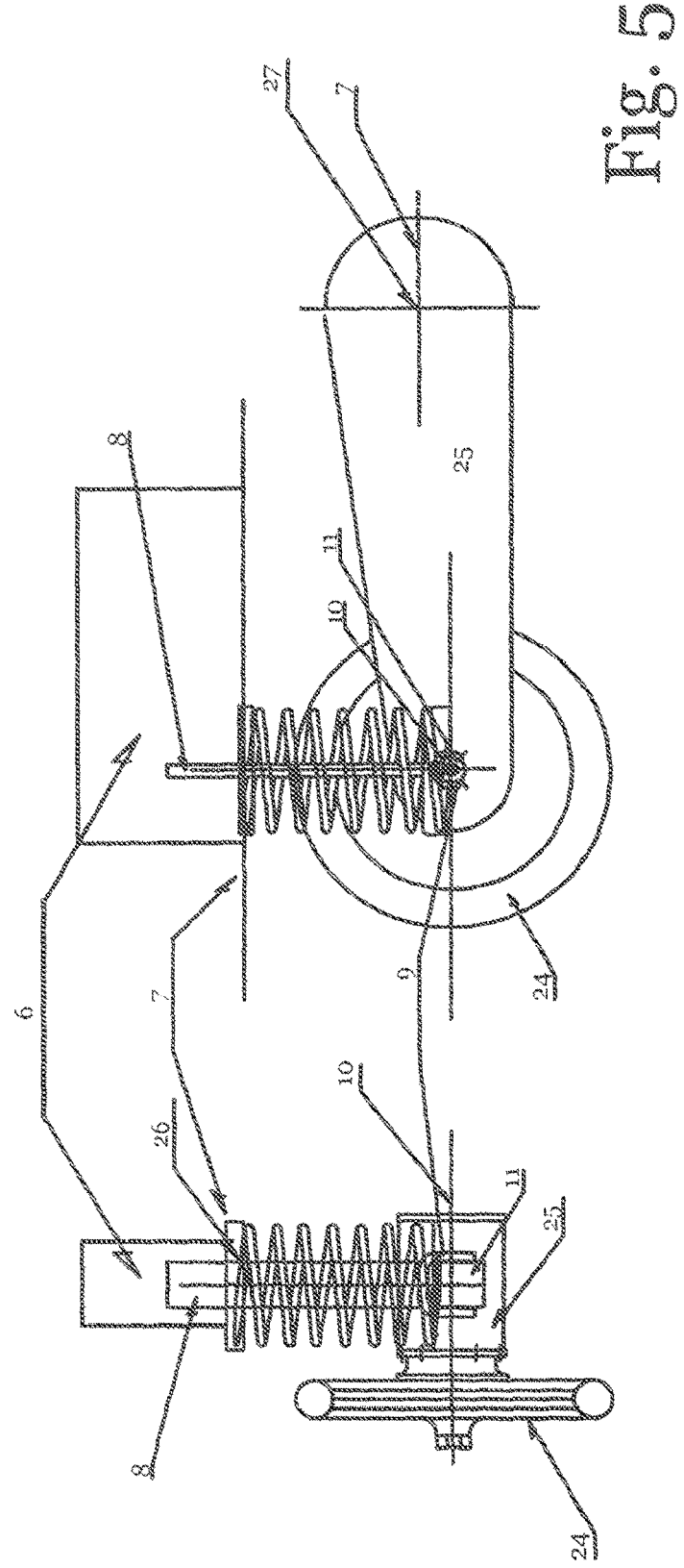

FIG. 5—illustrates two views, front and side, of the rack installation with a third wheel in the center of an imaginary rear axis for cars with independent rear suspension.

Figure 6:
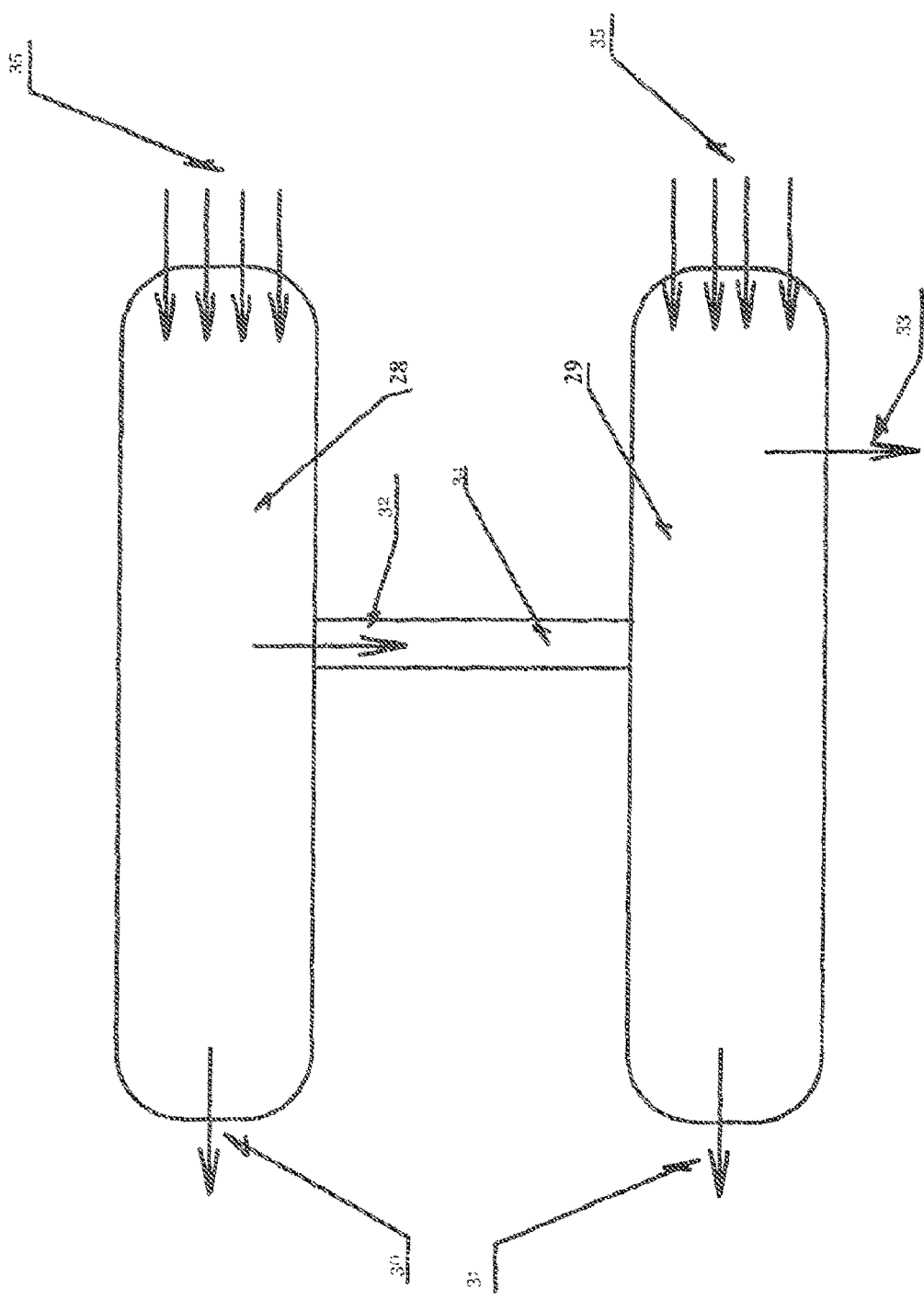

FIG. 6—illustrates a diagram of the compressed air storage tanks.

Figure 7:
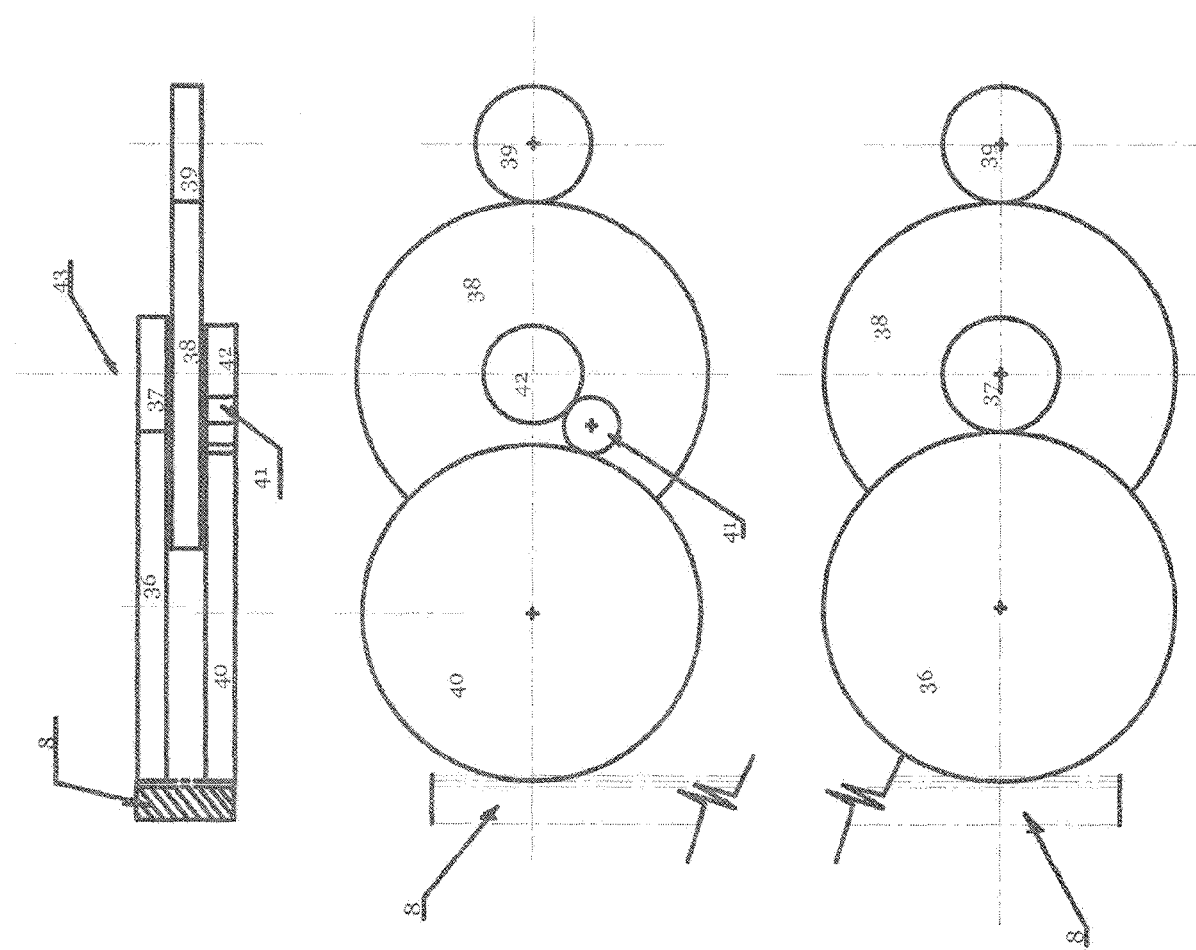

FIG. 7—illustrates a top view of the three gear trains, side right view and left side views. The wide rack can be seen in its ascending and descending runs respectively.

Figure 8:
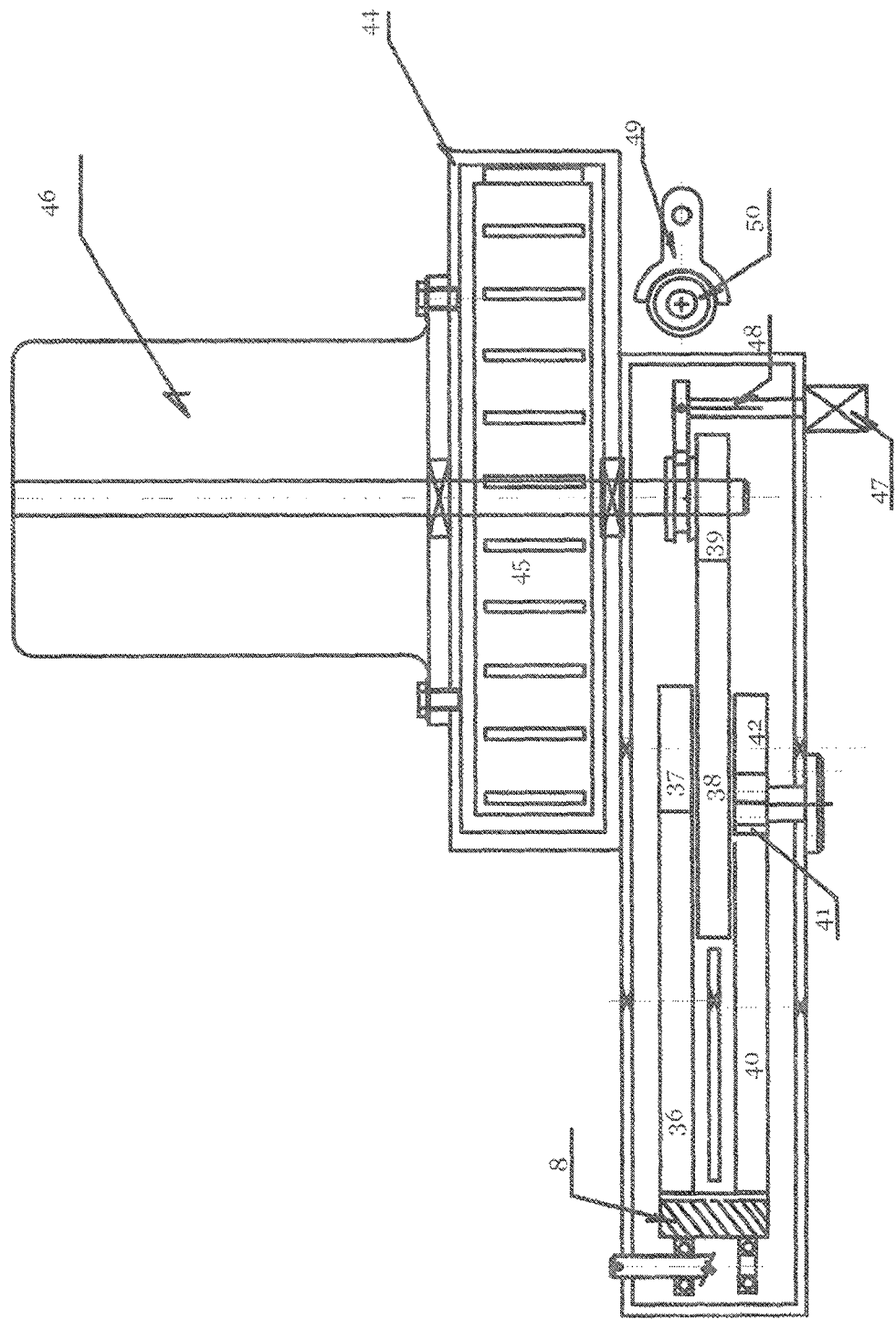

FIG. 8—illustrates a top view of the gearbox showing the assembling of the gearbox, coupling systems, turbine, and generator.

Figure 9:
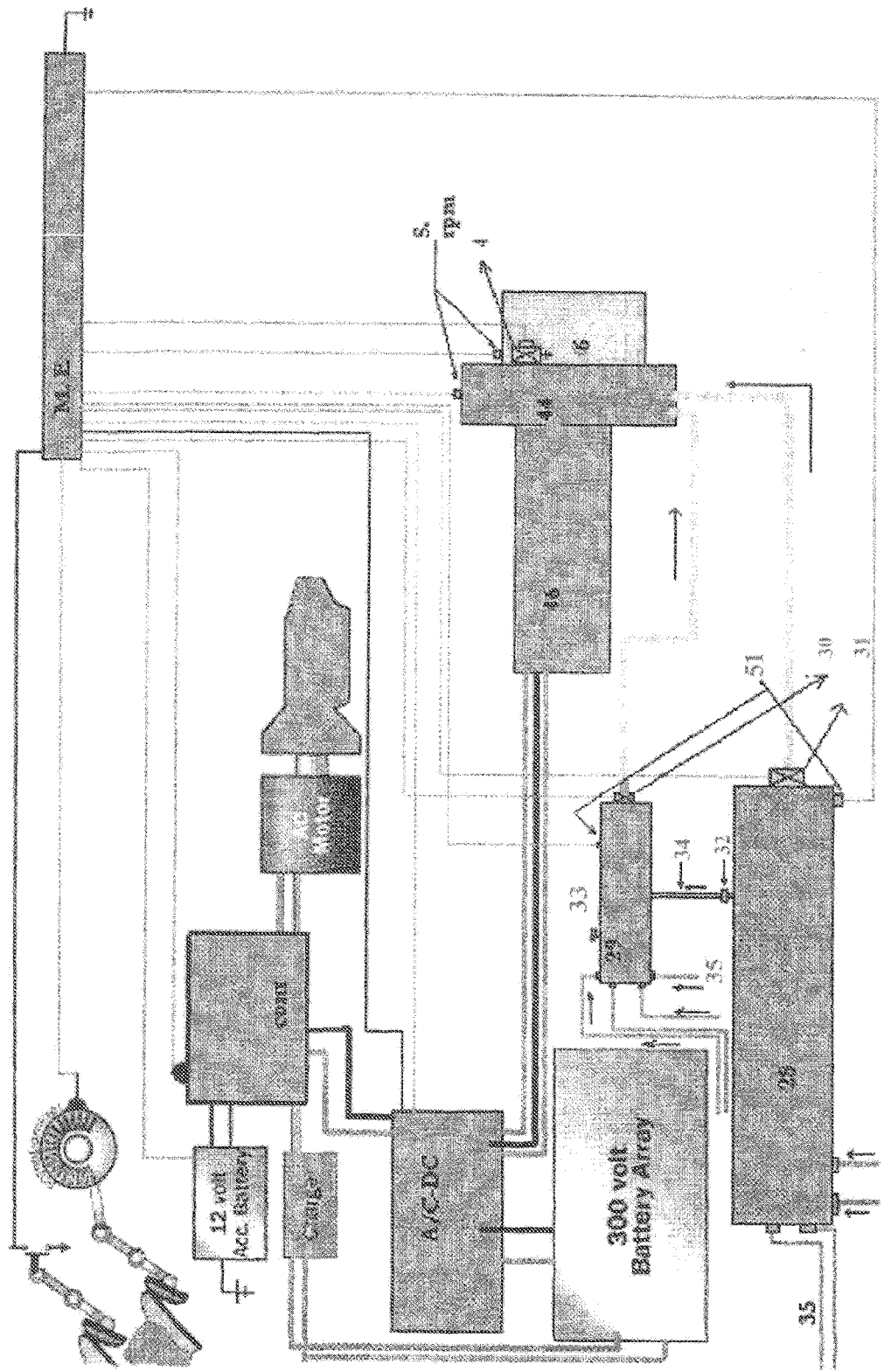

FIG. 9—illustrates a diagram showing the set of sensors and actuators and their electrical connections with the electronic module, and a view of the air compressed tanks with the gearbox assembly, the turbine and the generator

DETAILED DRAWINGS DESCRIPTION

Figure 1:
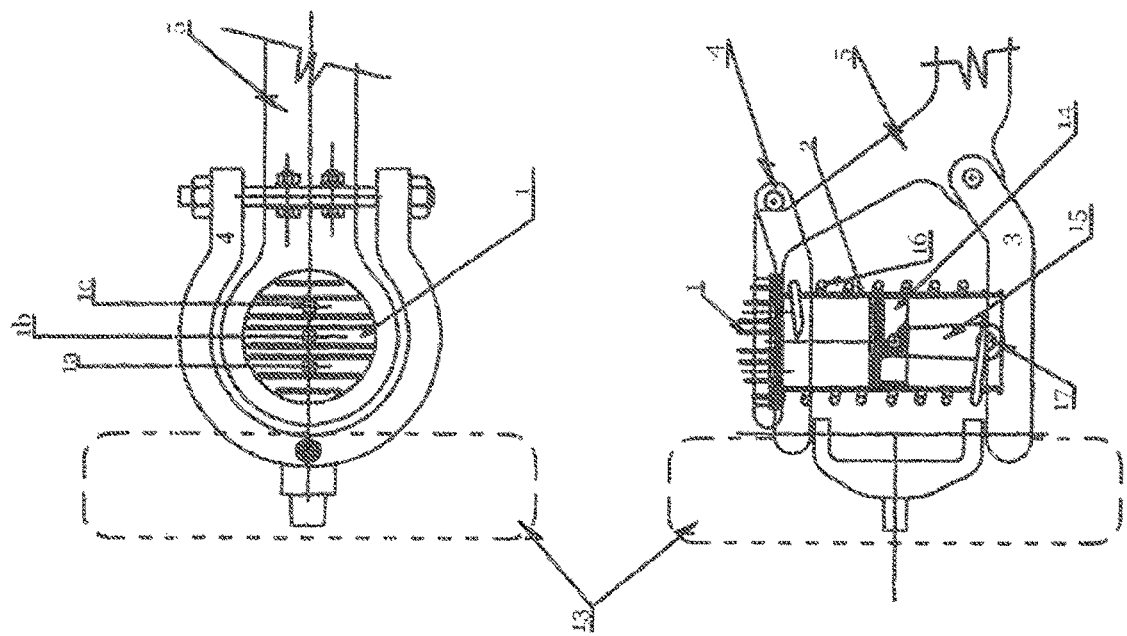
FIG. 1—illustrates a top view of a front suspension with a compressor cylinder, cap, and bridge fixation, the wheel, and upper grid.

In FIG. 1, a top view of the front suspension with a compressor cylinder (2) shows the cylinder cap (1) fixed by means of thread on the bridge (5). The three holes (1*a*, 1*b*, 1*c*) can be seen on the cover. There is a wheel (13) and the upper grid (4).

In FIG. 1, also a side view of the front suspension shows a cross section view of a compressor cylinder (2) enabling to show the piston (14), a rod (15, suspension spring (16) embracing to the cylinder (2) without touching it resting on the bridge (5), and the cylinder cap (1). A pin (17) fixed to the lower grid (3), attached to the rod (15). The top grid (4) and the wheel (13) also can be seen.

In FIG. 2, a side view of the front train shows a cylinder (2) with two slots (18), the lower grid (3), and upper grid (4) assembled to the bridge (5) of the vehicle.

In FIG. 2, also, the side view of the rear train shows a gearbox (6), body frame (7), the wide rack (8) welded to the inverted U (9), a pin (10), a silemblock (11) welded to the center of the rear differential (12), and the rear axle (19).

In FIG. 3, a side view of the rear suspension shows a cross section view of a compressor cylinder (2) with cap (1), enabling to see the piston (14), a rod (15) attached to the pin (17) which is located on a rear axle cavity, suspension spring (16) surrounding the cylinder (2) without touching it. The spring extends from the top to the bottom, between the body frame (7) which is fixed to the cylinder cap (1), and the rear axle (19) which is attached to the arm (20) of the rear suspension at one end, while the other end is attached to the body frame (7). Over the rear axle (19), supported to the differential (12), is the wide rack (8) welded to the inverted U (9), also a pin (10), and a silemblock (11) welded to the center of the differential. Also in this figure it can be seen the side view of the gearbox (6) and it's fastening by screws (21) to the body frame (7).

FIG. 4 shows an exploded view of a compressor cylinder (2) showing the cylinder cap (1), a first exhaust valve (23), inlet valve (22), a second exhaust valve (23), lateral and vertical view of the piston (14), rod (15), and spring (16).

FIG. 5 shows two views, front and side, of the installation of the rack (8) with a third wheel (24) in the center of an imaginary rear axle for vehicles with independent rear suspension. The rack (8) is inserted in the spiral spring (26). The grid of the third wheel (25) will be anchored with an axle (27) to the body frame (7) at one of its ends. At the other end is the wheel (24) with its mass, and supported at the other end of the lower grid (25) is the spring (26). The wide rack (8) is shown welded to the inverted U (9), also a pin (10), a silemblock (11) fixed on one end of the grid (25). Also, it shows a gear box (6) mounted on the body frame (7) and the rack (8) entering the gearbox (6) through an opening specially made for this purpose.

In FIG. 6, it shows the storage tanks (28 and 29), the main tank electro valve (30) and the auxiliary tank electro valve (31), a main tank exhaust valve (32) and an exhaust valve of the auxiliary tank (33), the connection pipes (34) between both tanks, pipes (35) from each of the exhaust valves (23) that come from the cylinders (2).

FIG. 7 shows a top view of the three gear trains, right side and left side views. Shows the wide rack (8) in its ascending movement in contact to the gear (36), which is in turn, in contact with the gear (37), and this, by sharing its axis (43) with gear (38) transmits movement to the gear (39). The wide rack in its descending movement is in contact with gear (40), which in turn is in contact with the gear (41), which in turn is in contact with the gear (42), which shares the axle with the gear (38), and in which transmits the motion to the gear (39).

FIG. 8 shows a top view of the gearbox (6) and shows the assembling of the gearbox (6), turbine casing (44), turbine (45) and generator (46). The coupling system includes a solenoid (47), coupling axis (48), fork (49) and synchronizer (50).

FIG. 9, illustrates a diagram of the whole set of elements and their connections.

Operation

The vehicle starts up with energy from the battery bank for the case of electric vehicle or with energy from accumulated air in their tanks in the case of compressed air vehicles.

The surfaces in which the vehicles transit are not regular. This makes that the ascent and descent of the suspension grid, the pistons inside the cylinders draw and compress air from the exterior of the vehicle directing the air through the pipes by means of two one-way exhaust valves located in each cylinder, towards the main and auxiliary storage tanks. This air can only enter, and cannot return because the valves are one-way. Greater air compression power is achieved by using pistons with sealing rings, this being a feature of this invention.

When the air enters at each one of the cylinders, it is previously filtered and enters through the one-way admission valve (FIG. 4, 22) as the piston goes down. Then, due to the irregularities of the ground, the piston rises with grid suspension pushing air through the one-way exhaust valve (FIG. 4, 23) by repeating the cycle.

Once there is enough pressure in the main tank, the excess air is directed through the second exhaust valve (FIG. 4, 23) calibrated to open at a higher pressure, redirecting the air to the second storage tank through a second pipe, thus avoiding an unnecessary rigidity in the suspension.

Security exhaust valve (FIG. 6, 32) calibrated, located in the main tank, sends the excess air through pipes to the auxiliary tank, if the pressure is high, so as to take advantage of this air to continue the storage of compressed air. The second safety valve (FIG. 6, 33), calibrated to be opened at a greater pressure in relation to the pressure supported by the first safety valve, is located in the auxiliary tank and releases the excess air to the outside.

Each tank will have a solenoid output valve (FIGS. 6, 30 and 31) commanded by the electronic module. Each solenoid valve directs the air into the turbine. By releasing the pressured air to the turbine via the pipe, it will accelerate the movement of the generator, which at that time is already in motion by the action of the gear box. The generator is capable of:

Feeding the engine with three-phase alternate current of the vehicle, interacting with the engine controller prior to converting its alternate current to continuous current, generating between 330 v and 380 v; or Moving a generator for a vehicle with a continuous current engine Loading a vehicle battery bank; or Feeding an electric compressor to load or reload compressed air tanks from a vehicle that works with compressed air.

Any of these decisions is commanded by the electronic module. The decisions related to direct air are carried out when data of each pressure tank reaches the module, obtained through pressure sensors (51) located in each tank.

The electronic module is a known computerized system that may execute certain decisions through data collection through the reading of sensors located in different areas of the mechanical compressor system.

On the vehicle panel, two manometers inform the driver of the pressure reading for each tank.

As the vehicle passes through the uneven ground the air compresses inside the tanks. At the same time, the gear box attached to the turbine is responsible for giving initial motion to the generator. This box is part of a mechanical mechanism formed by spin rotation gear with unidirectional torque and formed by three or more gear trains, and at least a rack vertically placed on the vehicle rear suspension or placed in an additional wheel, in the case of vehicles of three or more wheels with independent rear suspension, in order to take the ascending and descending movement of the vehicle suspension to transform it on rotation movement for the generator startup. The rack, when copying the ground irregularities, gets an ascending and descending movement.

In the ascending movement of the rack, two gear trains work with torque or force transmitting it to the generator. On the first gear train by the effect of the ascending movement of the rack, the gearing (FIG. 7,36) spins clockwise and is in contact turning the gear (FIG. 7, 37) in a counterclockwise direction. This gear shares its axis with the gear (FIG. 7, 38) belonging to the third gear train and forces it to rotate counterclockwise. The gear of the second gear train (FIG. 7, 40), which is in contact with the rack, freely rotates without transmitting power at this time. The gear (FIG. 7, 38), is being forced to rotate because it is joined to its axis, transmits movement to the exit gear of the generator axis (FIG. 7, 39). With these gear turns, provides an rpm multiplication. On an example of its construction, the gear (FIG. 7, 36) has 180 mm external diameter, the gear (FIG. 7, 37) has 60 mm external diameter, the gear (FIG. 7, 38) turns at the same rpm as the gear 37, but its exterior diameter is 180 mm, and the gear (FIG. 7, 39) or output gear has a 60 mm external diameter or less, depending on the diameter of the generator axis.

In the descending movement of the rack, the gear 36 freely spins without transmitting torque or force, in the likeness of a bike sprocket, but gear 40, which is also in contact with the rack, rotates counterclockwise and transmits movement with torque or force to a small gear 41 (FIG. 7, 41), which freely turns and whose function is to reverse the rotation of movement and transmit it to the gear 42 (FIG. 7, 42). This gear shares its axis with gear 38 belonging to the third gear trains, and forces it to also rotate counterclockwise. As in the case of the ascending movement, in the descending movement of the gear 38, as being compelled to turn by gear 42, for being joined to its axis, transmits the movement to the output gear of the axis of the generator 39. In these gear turns, an rpm multiplication is obtained, producing the same amount of turns when the rack goes up, as well as when it goes down. An example of its construction, the gear 40 has an exterior diameter of 173 mm, gear 41 has an external diameter of 30 mm, and gear 42 has an external diameter of 57 mm.

When the vehicle begins to move, the gearbox transforms the ascending and descending movement of the suspension on rpm of the startup of the generator. The exit gear 39 of the gearbox has a coupling system to the generator axis, being coupled and uncoupled, by a decision taken by the electronic module, since in its construction this gear freely turns on the generator axis. There is also a mechanical system with a fixed synchronization on the generator axis, a lever system, and a solenoid commanded by the module allowing to perform the coupling and decoupling functions of the gear 39.

The proposed gear system presents the advantage of equally taking both of the ascending and descending movements obtaining the same rpm output.

The invention uses an electronic module similar to the 12 v cars, which works with at least six sensors and three actuators. Two rotation sensors are of magnetic type or Hall's effect; they are located in the gearbox case for sensing the turbine rpm, which are the same as the generator, and the output gear 39 of the gear box, each of these sends signals which the module interprets as rpm. Compressed air tanks, each one has a pressure sensor (51) which we call third and fourth sensors. They send signals to the electronic module when the pressure in the tank is sufficient to open the valves and direct the air into the turbine through the pipe, being the electronic module to decide which will be opened, or if both will be opened at the same time. The fifth sensor is located on the accelerator pedal. The module receives a voltage through a potentiometer and thus it is possible to know whether the driver can accelerate the vehicle and in what percentage, or if the driver has to release the accelerator. The sixth sensor is a signal that receives the electronic module from the stop light. One actuator is a solenoid that is used to move an axis, and this, in turn, is used to move a fork and a synchronizer, similar to the manual transmission boxes of a car; its function is coupling or uncoupling gear 39 of the gearbox of the generator axis. The solenoid is commanded by the electronic module. The other two actuators are two electro valves, located one in each of the tanks of compressed air; two actuators have function to release the air compressed into the turbine. Both electro valves are commanded by the electronic module.

When beginning to move the vehicle, the gear 39 is coupled to the generator axis, as rpm are not detected through the turbine sensors nor through same gear 39. In electric vehicles, the energy to initially move the vehicle is provided by a battery bank that was previously loaded with the vehicle charger on the network. In compressed air vehicles, the energy to move them is provided by compressed air stored previously in the tanks brought from the factory. The electronic module works with 12 v from the vehicle and decides the changes of power in the case of electric motor vehicles, either from battery banks or from the generator, prior to its transformation from alternate current to continuous current by controlling the transformer AC/DC. These changes of feeding are carried out when the driver releases the accelerator pedal, which causes that the engine shuts down briefly, and then, the module performs these changes so there are no steps in the operation.

When the suspension compresses to compress the air through the cylinders, stores it in the main tank until a certain pressure which is determined according to the type of tank storage and the turbine construction; this pressure is sensed by the main tank pressure sensor (51) and sends this data to the module. The invention takes advantage of both the ascending and descending movement of rear suspension through the gearbox. This movement transforms it into rpm's generator startup. The rpms are counted by the Hall's effect sensor located in the case of gearbox sensing 39.

At some rpm regime—the maximum that a gearbox can transmit—the module decouples 39 of generator axis through the solenoid if the main tank pressure is sufficient. This data is obtained by a pressure sensor (51) placed in the tank. Immediately, the module opens the output electro-valve of the main compressed air tank and through the pipe to reach the turbine—which is already in motion—causing an acceleration of the rpm of the generator to produce electricity.

The turbine is built as an accumulator wheel, by which is stored kinetic energy.

The module will have the generator voltage information. When this voltage is sufficient to feed the engine, and the driver loosens the accelerator pedal, there occurs a change of power feeding from the battery bank to the generator, otherwise the flow is directed to charge the battery bank vehicle. According to the values of reading of pressure sensors (51) in the tanks, the generator output voltage and the turbine rpm, the module decides if it maintains the power feeding from the generator or if it returns to feed the engine from the battery bank. Prior to this, the generator current is converted into continuous current by the AC/DC transformer and then handed over to the motor controller or to the battery bank. The module couples the gear 39 to the generator axis when the 39 rpm and the turbine rpm tend to equalize. If the turbine rpms are high and the vehicle is stopped by releasing the accelerator pedal and stepping on the brake pedal, the module receives these signals through the accelerator pedal and the stop light, and since 39 is decoupled, the engine feeding change from the generator and its current passes to charge the battery bank. If the 39 rpm decreases by stepping on the brake, and 39 is coupled to the axis of the generator, the module decouples it to not stop the generator. After stepping on the accelerator, couples it again if the turbine rpms are equal or less than the 39. When the rpm of the generator are insufficient, the module will change feeding towards the battery bank. The driver will have a generator rpm tachometer and a luminous indicator of the power supply (battery or engine generator), and will be able to determine if it should suspend stepping on the accelerator for a brief moment to give time to the module to change feeding if it were from the generator to the battery bank. On compressed air vehicles, the module performs the same functions with the variant of deciding when you connect or disconnect the vehicle electric compressor, or charge its battery. In this latter case, previously the current transformation was made.

If the main tank pressure is very high in the cylinders, the calibrated exhaust valves are activated (FIG. 4, 23) directing the air to the auxiliary tank, and also opens the main tank (FIG. 6, 32) safety valve leading the excess of compressed air to the auxiliary tank, while the electronic module already has the main tank electro valve open. If the auxiliary tank is dangerously increasing its pressure, the module opens the auxiliary tank electro valve, releasing pressure to the turbine. Anyway, if the pressure was high in the auxiliary tank (FIG. 6, 33) the safety valve opens, expelling the excess of pressure to the outside.

In case of a module failure, in sensors or actuators, solenoid remains at rest leaving decoupled 39 of the generator axis.

INDUSTRIAL APPLICATION

The cylinders have two vertical machined slots to allow the piston rising to the upper dead point.

The turbine is constructed with a metal mass such that it allows storing kinetic energy.

The other pieces are well known and do not change the manufacture form.

The invention claimed is:

1. A mechanical compressor storage system for potential energy for electric energy generation for electric vehicles or compressed air vehicles taking advantage of a weight of the vehicle in motion, the mechanic compressor storage system comprising:
   a cylinder mounted on each vehicle wheel of the electric vehicle or the compressed air vehicle, wherein each cylinder including at least a sealing ring, at least a heat dissipation fin, and at least one vertical slot;
   a piston operatively inserted in each cylinder;
   an arm having a first end connected to the piston and a second end connected to a suspension grid or a suspension bracket;
   a pin sliding through each one of the slots;
   a rod connected to each one of the pins, the rod having a first end secured to the pin attached to the suspension grid or bracket grid and a second end secured to the piston;
   one-way valves operatively connected to each cylinder;
   at least one storage tank operatively connected to one of the one-way valves, wherein each one of the storage tanks includes at least one sensor, at least one actuator, and a solenoid output valve commanded by an electronic module;
   an electro-valve operatively connected to each storage tank;
   at least one gear box connected to at least one rack connected to the third wheel of the rear suspension grid or of the rear suspension bracket, or to the middle of the rear axle;
   a turbine having a first end connected to the gear box and a second end connected to a generator;
   a coupling and decoupling system operatively connected to an exit gear of the gear box, wherein the coupling and decoupling system includes a solenoid, a coupling axis, and a synchronizer;
   wherein movement of the vehicle moves the suspension grid or the suspension bracket on an ascending or descending movement;

wherein the ascending or descending movement of the suspension grid or the suspension bracket produces the pistons to draw and compress air from the atmosphere;

wherein the air is directed from the cylinders to the storage tanks through pipes;

wherein when commanded by the electronic module the solenoid output valve directs the air into the turbine producing the turbine to rotate;

wherein the rotation of the turbine activates the generator.

2. The mechanical compressor storage system according to claim 1, wherein the gearbox comprises:

at least one gear train, including unidirectional rotation bearings, wherein each gear train rotates with torque in a first direction transmitting force and in a second direction freely spinning without transmitting force;

a wide rack or two racks coupled together by a plate vertically placed on a rear axle of the vehicle; and a simple gear that changes the rotational direction of one of the gear trains.

3. The mechanical compressor storage system according to claim 2, wherein the gear train comprises:

a first gear train including a first type A gear, a second type A gear, and a third type B gear;

a second gear train including a first and a second type A gear; and a third gear train including in the same axis a type B gear fixed to a generator axel that connected to an output gear of the generator and a first and second type A gears.

4. The mechanical compressor storage system according to claim 3, wherein the third gear train includes:

a rack in contact with the first and the second gear trains;

wherein on the ascending movement of the rack, the first type A gear of the first gear train transmits movement with torque or force to the second type A gear of the first gear train, and wherein the second type A gear of the first gear train shares an axis with the type B gear of the third gear train, wherein the type B gear of the third gear train transmits movement of the generator axle;

wherein on the descending movement of the rack, the first type A gear of the second gear train transmits movement with torque or force to the type B gear, wherein the type B gear inverts the rotation of movement and transmits it to the second type A gear of the first gear train which is in contact with the type B gear of the third gear train, the type B gear of the third gear train transmits movement to the output gear of the generator multiplying the revolution per minute of the generator.

5. The mechanical compressor storage system according to claim 1, further including a bank of batteries.

6. The mechanical compressor storage system according to claim 1, wherein the suspension grid or the suspension bracket are secured to a bodywork of the vehicle.

7. The mechanical compressor storage system according to claim 1, wherein by simultaneous work:

in the ascending and descending movement of the rack, the gear trains work with torque or force, transmitting to the rpm startup to the generator;

the air is compressed in the air compressed storage tanks;

the compressed air is directed into the turbine to accelerate speed of the generator and produce the electric current to an auto charge battery bank or to feed a compressor electric engine.

8. The mechanical compressor storage system according to claim 1, wherein the electronic module makes a decision of when to activate or deactivate the mechanic compressor storage system based on a signal received from the sensors and the actuators.

* * * * *